(12) United States Patent
Uchiumi et al.

(10) Patent No.: US 12,449,957 B2
(45) Date of Patent: Oct. 21, 2025

(54) DOCUMENT EDITING APPARATUS, NON-TRANSITORY COMPUTER READABLE MEDIUM STORING PROGRAM, AND DOCUMENT EDITING METHOD

(71) Applicant: FUJIFILM Business Innovation Corp., Tokyo (JP)

(72) Inventors: Yohei Uchiumi, Kanagawa (JP); Koji Bito, Kanagawa (JP); Takenori Matsuo, Kanagawa (JP); Atsushi Maruyama, Kanagawa (JP); Yoshihito Suezawa, Kanagawa (JP); Kosuke Kikushima, Kanagawa (JP); Kosuke Ichikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 374 days.

(21) Appl. No.: 17/976,887

(22) Filed: Oct. 31, 2022

(65) Prior Publication Data

US 2023/0376177 A1    Nov. 23, 2023

(30) Foreign Application Priority Data

May 23, 2022    (JP) .................................. 2022-083864

(51) Int. Cl.
*G06F 3/0483*    (2013.01)
*G06F 40/166*    (2020.01)

(52) U.S. Cl.
CPC .......... *G06F 3/0483* (2013.01); *G06F 40/166* (2020.01)

(58) Field of Classification Search
None
See application file for complete search history.

(56) References Cited

U.S. PATENT DOCUMENTS

| 9,875,269 | B1* | 1/2018 | Doak .................... G06F 16/958 |
| 10,133,716 | B2* | 11/2018 | Konnola ............. G06Q 10/101 |
| 2014/0365579 | A1* | 12/2014 | Thrasybule ........... G06F 40/117 709/205 |
| 2020/0293610 | A1 | 9/2020 | Okamoto | |

FOREIGN PATENT DOCUMENTS

| JP | H0816553 | 1/1996 |
| JP | 2020149194 | 9/2020 |
| JP | 6881920 | 6/2021 |

* cited by examiner

*Primary Examiner* — Gabriel Mercado
(74) *Attorney, Agent, or Firm* — JCIPRNET

(57) ABSTRACT

A document editing apparatus includes: a processor configured to: in a case where a second user performs an operation of dividing an original document including plural pages into plural division documents while a first user is editing the electronic original document, display an operator for displaying another division document different from a division document including a page being edited by the first user, on a screen on which the page being edited is displayed.

7 Claims, 19 Drawing Sheets

FIG. 4

| PAGE ID | DOCUMENT NAME | PAGE NUMBER IN ORIGINAL DOCUMENT | DIVISION DOCUMENT NAME OF MOVEMENT DESTINATION (RELATIVE PATH) | PAGE NUMBER IN DIVISION DOCUMENT | NAME OF USER WHO PERFORMS OPERATION |
|---|---|---|---|---|---|
| 0001 | DOCUMENT.xxx | 1 | ..¥folderA¥DOCUMENT-1.xxx | 1 | USER B |
| 0002 | DOCUMENT.xxx | 2 | ..¥folderA¥DOCUMENT-1.xxx | 2 | USER B |
| 0003 | DOCUMENT.xxx | 3 | ..¥folderA¥DOCUMENT-1.xxx | 3 | USER B |
| 0004 | DOCUMENT.xxx | 4 | ..¥folderA¥DOCUMENT-1.xxx | 4 | USER B |
| 0005 | DOCUMENT.xxx | 5 | ..¥folderA¥DOCUMENT-1.xxx | 5 | USER B |
| 0006 | DOCUMENT.xxx | 6 | ..¥folderA¥DOCUMENT-2.xxx | 1 | USER B |
| 0007 | DOCUMENT.xxx | 7 | ..¥folderA¥DOCUMENT-2.xxx | 2 | USER B |
| 0008 | DOCUMENT.xxx | 8 | ..¥folderA¥DOCUMENT-2.xxx | 3 | USER B |
| 0009 | DOCUMENT.xxx | 9 | ..¥folderA¥DOCUMENT-2.xxx | 4 | USER B |
| 0010 | DOCUMENT.xxx | 10 | ..¥folderA¥DOCUMENT-2.xxx | 5 | USER B |

FIG. 5

| PAGE ID | DOCUMENT NAME | PAGE NUMBER IN ORIGINAL DOCUMENT | DIVISION DOCUMENT NAME OF MOVEMENT DESTINATION (RELATIVE PATH) | PAGE NUMBER IN DIVISION DOCUMENT | NAME OF USER WHO PERFORMS OPERATION |
|---|---|---|---|---|---|
| 0011 | DOCUMENT.xxx | 1 | ..¥folderA¥DOCUMENT-1.xxx | 1 | USER B |
| 0012 | DOCUMENT.xxx | 2 | ..¥folderA¥DOCUMENT-2.xxx | 1 | USER B |
| 0013 | DOCUMENT.xxx | 3 | ..¥folderA¥DOCUMENT-3.xxx | 1 | USER B |
| 0014 | DOCUMENT.xxx | 4 | ..¥folderA¥DOCUMENT-4.xxx | 1 | USER B |
| 0015 | DOCUMENT.xxx | 5 | ..¥folderA¥DOCUMENT-5.xxx | 1 | USER B |

FIG. 6

| PAGE ID | DOCUMENT NAME | PAGE NUMBER IN ORIGINAL DOCUMENT | DIVISION DOCUMENT NAME OF MOVEMENT DESTINATION (RELATIVE PATH) | PAGE NUMBER IN DIVISION DOCUMENT | NAME OF USER WHO PERFORMS OPERATION |
|---|---|---|---|---|---|
| 0021 | DOCUMENT.xxx | 1 | DOCUMENT.xxx | 1 | USER B |
| 0022 | DOCUMENT.xxx | 2 | DOCUMENT.xxx | 2 | USER B |
| 0023 | DOCUMENT.xxx | 3 | DOCUMENT.xxx | 3 | USER B |
| 0024 | DOCUMENT.xxx | 4 | DOCUMENT.xxx | 4 | USER B |
| 0025 | DOCUMENT.xxx | 5 | DOCUMENT.xxx | 5 | USER B |
| 0026 | DOCUMENT.xxx | 6 | DOCUMENT.xxx | 6 | USER B |
| 0027 | DOCUMENT.xxx | 7 | DOCUMENT.xxx | 7 | USER B |
| 0028 | DOCUMENT.xxx | 8 | ..¥folderA¥DOCUMENT-page8.xxx | 1 | USER B |
| 0029 | DOCUMENT.xxx | 9 | DOCUMENT.xxx | 8 | USER B |
| 0030 | DOCUMENT.xxx | 10 | DOCUMENT.xxx | 9 | USER B |

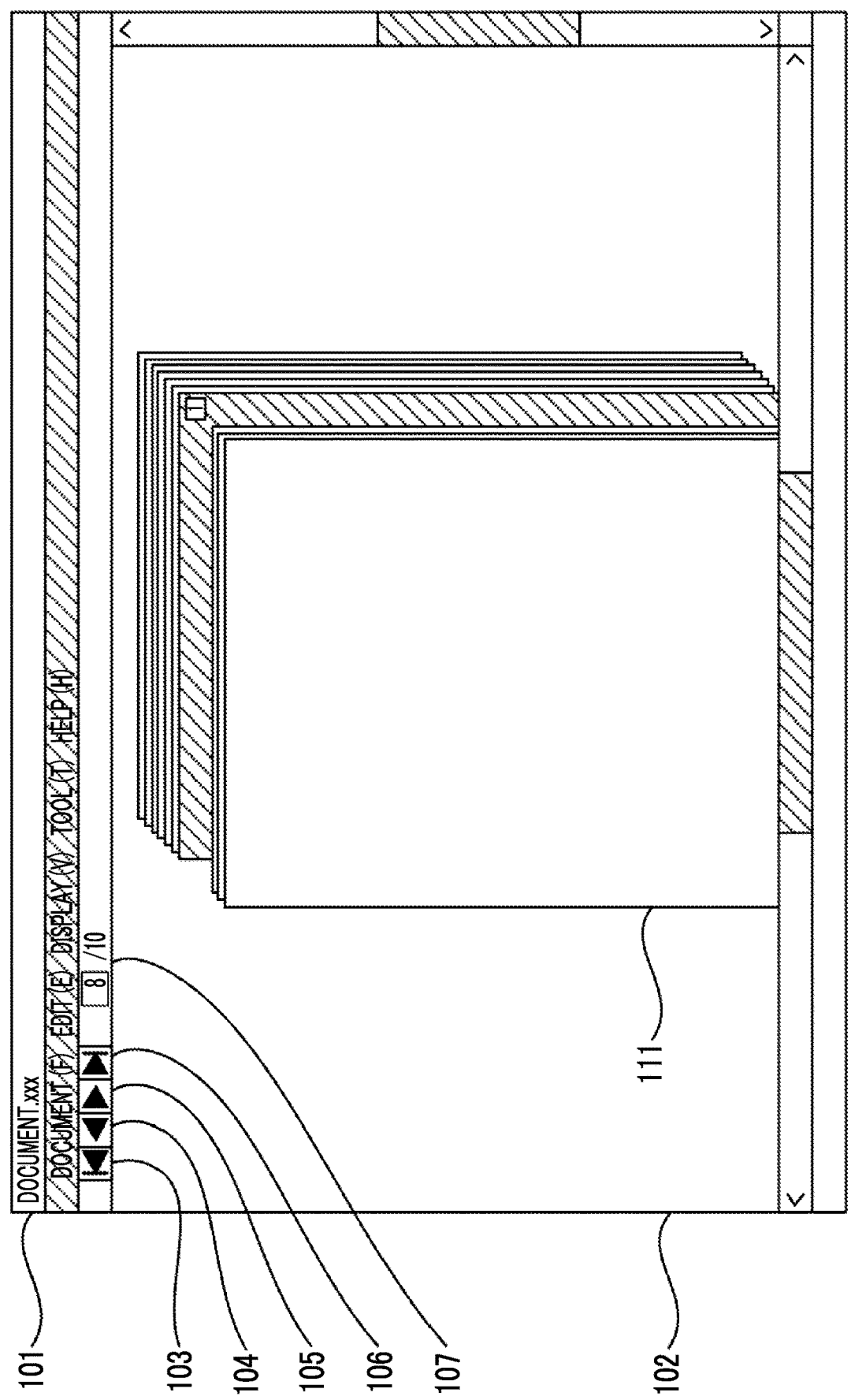

DOCUMENT EDITING APPARATUS, NON-TRANSITORY COMPUTER READABLE MEDIUM STORING PROGRAM, AND DOCUMENT EDITING METHOD

CROSS-REFERENCE TO RELATED APPLICATIONS

This application is based on and claims priority under 35 USC 119 from Japanese Patent Application No. 2022-083864 filed May 23, 2022.

BACKGROUND

(i) Technical Field

The present invention relates to a document editing apparatus, a non-transitory computer readable medium storing a program, and a document editing method.

(ii) Related Art

In JP1996-016553A, a document processing system that secures high responsiveness to a document file in a case where the document file is shared by a plurality of document processing apparatuses and the document is edited is described.

In JP6881920B, an information processing apparatus capable of registering a part of annotation information to be indexed among a plurality of pieces of annotation information included in a file, in association with a predetermined index item is described.

In JP2020-149194A, a document editing apparatus capable of obtaining a document in which an editing result is reflected even in a case where a plurality of documents including a document being edited are bundled is described.

SUMMARY

In a case where an electronic document consisting of a plurality of pages is co-edited by a plurality of users, while one user is editing some pages of the original document, another user may perform an operation of dividing the original document into a plurality of division documents.

In this case, on a screen during editing, the user cannot display a page that is included in the original document but divided into a division document different from the division document including the page being edited.

Aspects of non-limiting embodiments of the present disclosure relate to a document editing apparatus, a non-transitory computer readable medium storing a program, and a document editing method that display, even in a case where an electronic original document consisting of a plurality of pages is divided into a plurality of division documents during editing by a user, a page included in the original document on a screen during editing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a document editing apparatus including: a processor configured to: in a case where a second user performs an operation of dividing an original document consisting of a plurality of pages into a plurality of division documents while a first user is editing the electronic original document, display an operator for displaying another division document different from a division document including a page being edited by the first user, on a screen on which the page being edited is displayed.

BRIEF DESCRIPTION OF THE DRAWINGS

Exemplary embodiment(s) of the present invention will be described in detail based on the following figures, wherein:

FIG. 4 is a diagram illustrating an example of information recorded in a co-editing database in a case where "divide" is performed;

FIG. 5 is a diagram illustrating an example of information recorded in the co-editing database in a case where "split" is performed;

FIG. 6 is a diagram illustrating an example of information recorded in the co-editing database in a case where "extract" is performed;

FIG. 7 is a diagram illustrating a display example of an editing screen, and is a diagram illustrating a state in which an original document is displayed;

DETAILED DESCRIPTION

Hereinafter, exemplary embodiments of the present invention will be described in detail with reference to the accompanying drawings. In the present exemplary embodiment, a case where the present invention is applied to a document editing system 1 including a document editing apparatus 10 configured with a server computer or the like, a terminal 20 individually used by each user, and a server 30 configured with a server computer will be described.

Figure 1:
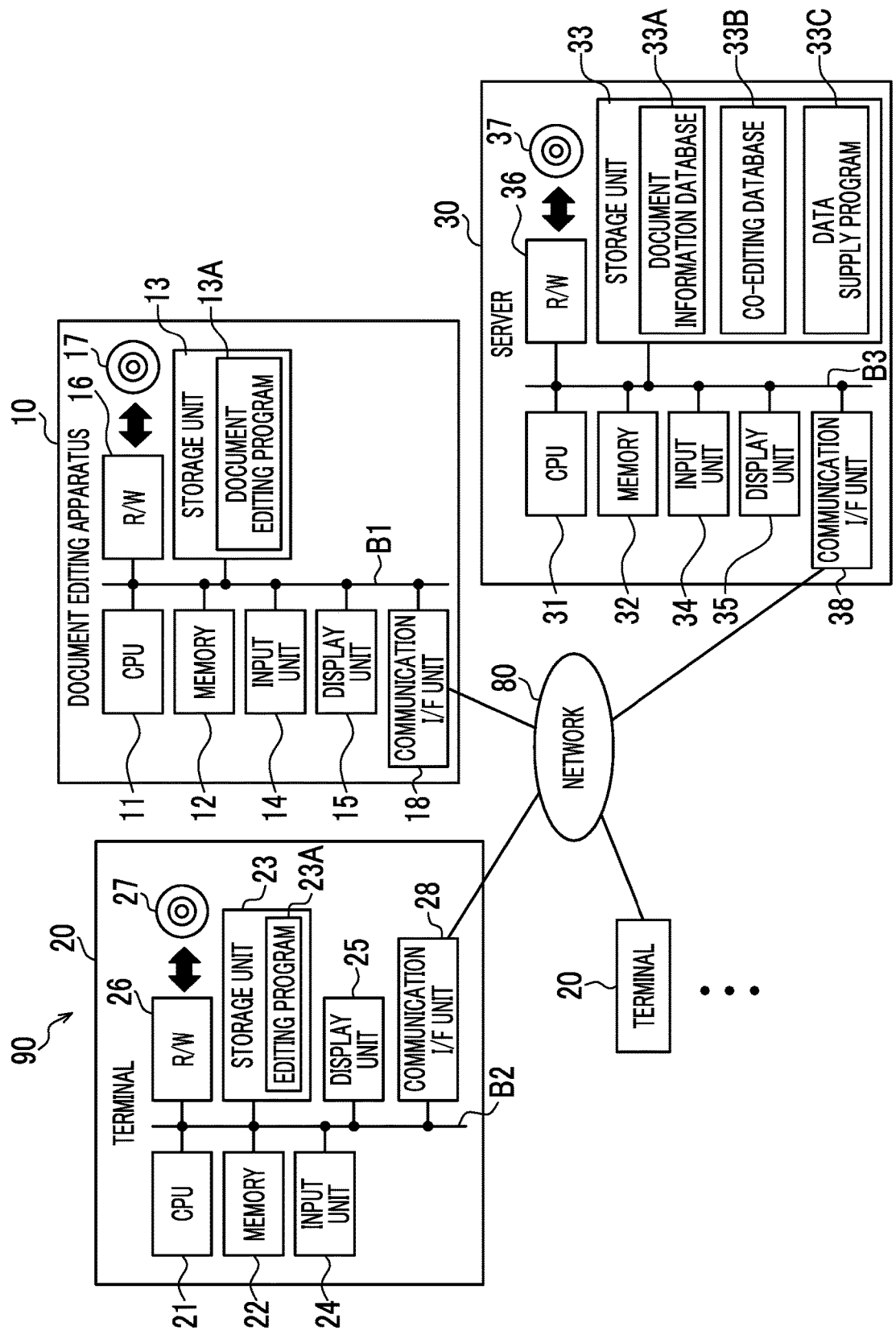
FIG. 1 is a diagram illustrating a system configuration of a document editing system according to an exemplary embodiment of the present invention.

First, a configuration of the document editing system 1 according to the present exemplary embodiment will be described with reference to FIG. 1. As illustrated in FIG. 1, the document editing system 1 according to the present exemplary embodiment includes the document editing apparatus 10, a plurality of terminals 20, and the server 30, which are connected to a network 80 to be mutually accessible to each other.

Examples of the document editing apparatus 10 include an information processing apparatus such as a personal computer and a server computer. Examples of the terminal 20 include a portable terminal such as a smart phone, a tablet terminal, and a personal digital assistant (PDA), and a personal computer.

Document Editing Apparatus

The document editing apparatus 10 is an apparatus that comprehensively manages various types of information handled by the document editing system 1.

The document editing apparatus 10 includes a central processing unit (CPU) 11, a memory 12 as a temporary storage region, a non-volatile storage unit 13, an input unit 14 such as a keyboard or a mouse, a display unit 15 such as a liquid crystal display, a medium read/write device (R/W) 16, and a communication interface (I/F) unit 18.

The CPU 11, the memory 12, the storage unit 13, the input unit 14, the display unit 15, the medium read/write device 16, and the communication I/F unit 18 are connected to each other via a bus B1. The medium read/write device 16 reads information written in the recording medium 17, and writes the information to the recording medium 17.

The storage unit 13 is implemented by a hard disk drive (HDD), a solid state drive (SSD), a flash memory, or the like. A document editing program 13A is stored in the storage unit 13 as a storage medium.

The recording medium 17 in which the document editing program 13A is written is set in the medium read/write device 16, and the medium read/write device 16 reads the document editing program 13A from the recording medium 17, so that the document editing program 13A is stored in the storage unit 13.

The document editing program 13A may be downloaded via the network 80. The CPU 11 reads out the document editing program 13A from the storage unit 13, develops the document editing program 13A into the memory 12, and sequentially executes each process included in the document editing program 13A.

Terminal

The terminal 20 according to the present exemplary embodiment is a terminal possessed by each of a plurality of target persons who are intended to use the document editing system 1. The terminal 20 includes a CPU 21, a memory 22 as a temporary storage region, a non-volatile storage unit 23, an input unit 24 such as a touch panel, a display unit 25 such as a liquid crystal display, a medium read/write device (R/W) 26, and a communication interface (I/F) unit 28. The other terminals 20 have the identical configurations.

The CPU 21, the memory 22, the storage unit 23, the input unit 24, the display unit 25, the medium read/write device 26, and the communication I/F unit 28 are connected to each other via a bus B2. The medium read/write device 26 reads information written in the recording medium 27, and writes the information to the recording medium 27.

The storage unit 23 is implemented by an HDD, an SSD, a flash memory, or the like. The storage unit 23 as a storage medium stores an editing program 23A for editing and bundling documents stored in the server 30, which will be described below, and for giving other instructions.

The editing program 23A is stored in the storage unit 23 in a case where the recording medium 27 in which the editing program 23A is written is set in the medium read/write device 26, and the medium read/write device 26 reads the editing program 23A from the recording medium 27. The CPU 21 reads out the editing program 23A from the storage unit 23, develops the editing program 23A in the memory 22, and sequentially executes each process included in the editing program 23A. The editing program 23A may be downloaded via the network 80.

As a result, the CPU 21 operates according to the editing program 23A, so that the terminal 20 can be used to edit a document stored in the server 30, which will be described below, or to divide a plurality of documents.

Server

The server 30 is an apparatus that comprehensively manages documents handled by the document editing system 1 or a state of each document.

The server 30 includes a CPU 31, a memory 32 as a temporary storage region, a non-volatile storage unit 33, an input unit 34 such as a keyboard and a mouse, a display unit 35 such as a liquid crystal display, a medium read/write device (R/W) 36, and a communication interface (I/F) unit 38.

The CPU 31, the memory 32, the storage unit 33, the input unit 34, the display unit 35, the medium read/write device 36, and the communication I/F unit 38 are connected to each other via a bus B3. The medium read/write device 36 reads information written in the recording medium 37, and writes the information to the recording medium 37.

The storage unit 33 is implemented by an HDD, an SSD, a flash memory, or the like. The storage unit 33 as a storage medium stores a document information database 33A, a co-editing database 33B, and a data supply program 33C. A plurality of documents are stored in the document information database 33A, and information of each document is stored in the co-editing database 33B. The data supply program 33C may be downloaded or uploaded via the network 80.

The data supply program 33C is stored in the storage unit 33 by setting the recording medium 37 in which the data supply program 33C is written in the medium read/write device 36 and reading the data supply program 33C from the recording medium 37 by the medium read/write device 36.

The CPU 31 reads out the data supply program 33C from the storage unit 33, develops the data supply program 33C in the memory 32, and sequentially executes each process included in the data supply program 33C.

As a result, the CPU 31 operates according to the data supply program 33C to transmit data of the document information database 33A and the co-editing database 33B to a requesting terminal or the document editing apparatus 10.

Next, a functional configuration of the document editing system 1 according to the present exemplary embodiment will be described with reference to FIGS. 2 to 6.

Document Editing Apparatus

Figure 2:
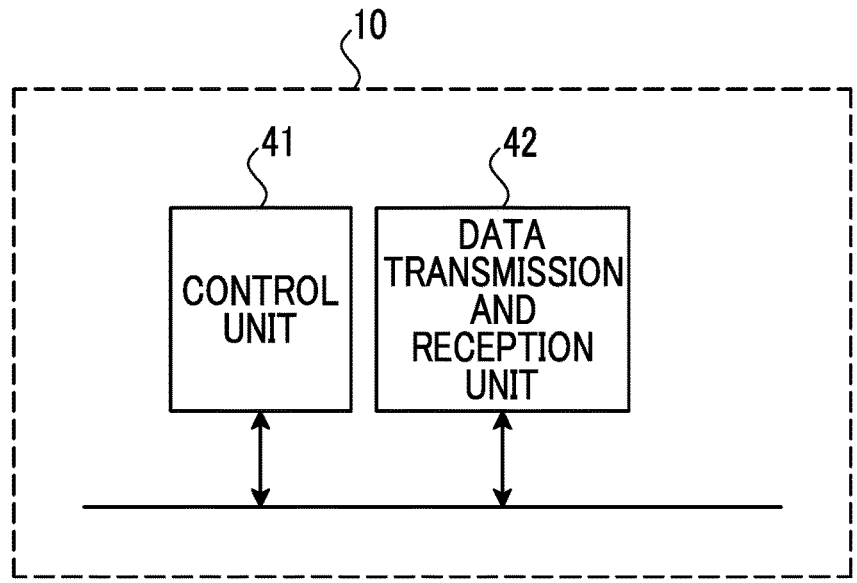
FIG. 2 is a block diagram illustrating a function of a document editing apparatus.

As illustrated in FIG. 2, the document editing apparatus 10 of the present exemplary embodiment has a control unit 41 and a data transmission and reception unit 42 for transmitting and receiving data to and from an external apparatus. In a case where the CPU 11 of the document editing apparatus 10 executes the document editing program 13A, the control unit 41 functions as follows.

The control unit 41 controls an overall operation of the document editing apparatus 10. Further, in a case where a second user performs an operation of dividing an original document consisting of a plurality of pages into a plurality of division documents while a first user is editing the electronic original document, the control unit 41 displays an operator for displaying a division document different from a division document including a page being edited by the first user, on a screen on which the page being edited is displayed.

Here, the "operation of dividing an original document into a plurality of division documents" may be any operation as long as the operation is an operation of dividing one original document into a plurality of division documents such as "divide", "split", and "extract", for example.

The "divide" is an operation of dividing an original document into two division documents before and after a specific position. The "split" is an operation of dividing each page of the original document into each division document different from each other. The "extract" is an operation of dividing the original document into division documents obtained by extracting specific pages from the original document and division documents consisting of remaining pages obtained by extracting the specific pages from the original document.

Terminal

Figure 3:
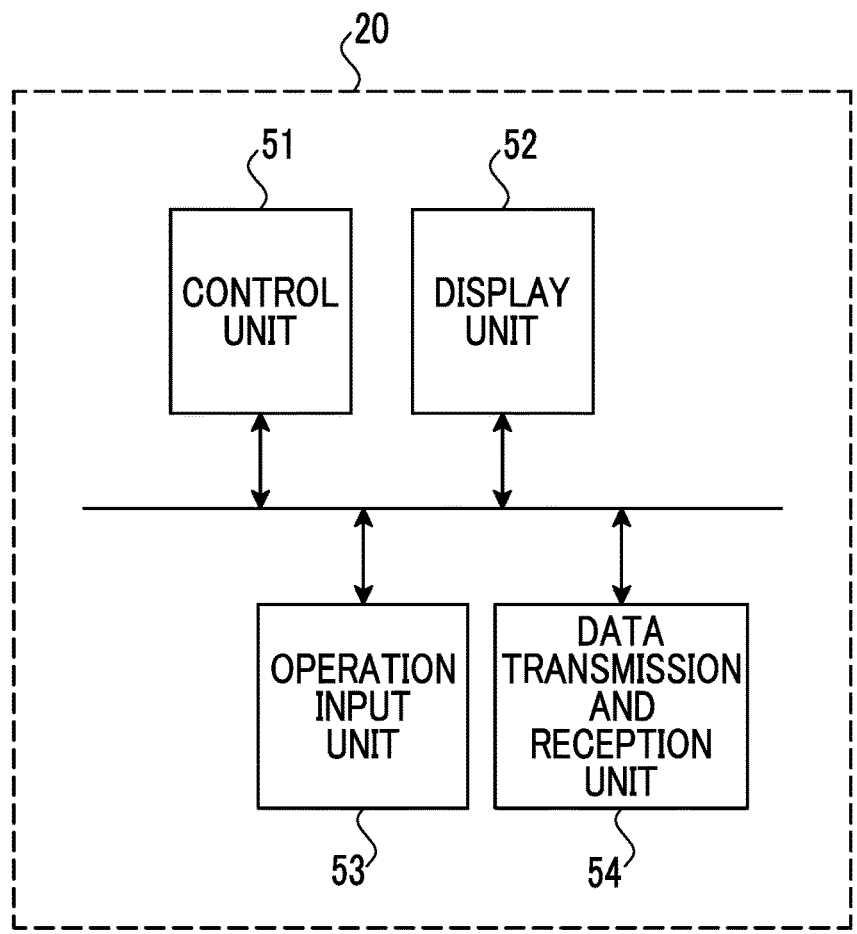
FIG. 3 is a block diagram illustrating a function of a terminal.

The terminal 20 of the present exemplary embodiment has a control unit 51, a display unit 52, an operation input unit 53, and a data transmission and reception unit 54, as illustrated in FIG. 3.

The control unit 51 controls an overall operation of the terminal 20. The display unit 52 is controlled by the control unit 51, and displays various types of information to a user. The operation input unit 53 inputs information on various operations performed by the user. The data transmission and reception unit 54 transmits and receives data to and from an external apparatus.

Document Information Database

A plurality of documents are stored in the document information database 33A according to the present exemplary embodiment. These documents are shared documents, and the stored documents can be edited by using the terminal 20. Further, via the document editing apparatus 10, an operation of dividing an original document into a plurality of division documents can be performed.

Co-Editing Database

The co-editing database 33B stores information indicating to which page of which division document each page of an original document is moved in a case where an operation of dividing the original document into a plurality of division documents. The information of the co-editing database 33B is sequentially updated by the CPU 31 of the server 30.

Specifically, in the co-editing database 33B according to the present exemplary embodiment, as illustrated in FIGS. 4 to 6, information such as "page ID", "original document name", "page number in division document", "division document name of movement destination", "page number in division document", and "name of user who executes operation" is managed. "Original document name", "page number in division document", "division document name of movement destination", "page number in division document", and "name of user who executes operation" are stored in association with "page ID".

The "page ID" is information indicating an ID for specifying each page in the original document. The "original document name" is information indicating a document name stored in the document information database 33A, and a file name of the document is stored as an example of the document name. The "page number in division document" is information indicating a page number of the corresponding page in the original document. The "division document name of movement destination" is information indicating a name of a division document to which the corresponding page is moved. In the present exemplary embodiment, the division document name is displayed as a relative path to the original document. The "page number in division document" is information indicating a page number in the division document to which the page is moved. The "name of user who executes operation" is information indicating a name of a user who performs an operation of dividing the original document into a plurality of division documents.

In FIGS. 4 to 6, the extension of ".xxx" indicated in "original document name" and "division document name of movement destination" is illustrated as an example. There are no particular restrictions on a type and an extension of a file handled in the document editing system 1.

Here, with reference to FIG. 4, information recorded in the co-editing database 33B in a case where the "divide" is performed as an operation of dividing a document into a plurality of division documents will be described. Here, an example of a case where a document named "document.xxx" consisting of 10 pages as an original document is divided between pages 5 and 6 by a user B will be described.

In the present example, it is assumed that pages 1 to 5 of the "document.xxx" are moved to pages 1 to 5 of a document named "document-1.xxx" as a division document of a movement destination, and pages 6 to 10 are moved to pages 1 to 5 of a document named "document-2.xxx" as the division document of the movement destination.

In this case, as illustrated in FIG. 4, for example, page IDs of 0001 to 0010 are assigned to the respective pages 1 to 10 of the original document, in the "page ID" item.

For each page ID, the "document.xxx" is recorded in the "original document name" item, and the page number in the original document is recorded in the "page number in division document" item.

In addition, the pages 1 to 5 of the "document.xxx", that is, pages with the page IDs 0001 to 0005 are moved to pages 1 to 5 of the "document-1.xxx".

Therefore, "..\folderA\document-1.xxx" is recorded in the item "division document name of movement destination" of these pages. A relative path of the "document-1.xxx" for the "document.xxx" that is the original document is displayed. Further, the pages 1 to 5 are recorded in order in the item of the "page number in division document" of these pages.

In addition, the pages 6 to 10 of the "document.xxx", that is, pages with the page IDs 0006 to 0010 are moved to the pages 1 to 5 of the "document-2.xxx".

Therefore, "..\folderA\document-2.xxx" is recorded in the item "division document name of movement destination" of these pages. A relative path of the "document-2.xxx" for the "document.xxx" that is the original document is displayed. Further, the pages 1 to 5 are recorded in order in the item of the "page number in division document" of these pages.

In addition, the user B who performs the "divide" operation on the original document is recorded in the item "name of user who executes operation" of the pages with the page IDs 0001 to 0010.

Next, with reference to FIG. 5, information recorded in the co-editing database 33B in a case where the "split" is performed as an operation of dividing a document into a plurality of division documents will be described. Here, an example of a case where a document named "document.xxx" consisting of 5 pages as an original document is split for each page, by the user B will be described.

In the present example, it is assumed that the pages 1 to 5 of the "document.xxx" are moved to pages 1 of the "document-1.xxx" to "document-5.xxx" as a division document of each movement destination.

In this case, as illustrated in FIG. 5, for example, page IDs of 0011 to 0015 are assigned to the respective pages 1 to 5 of the original document, in the "page ID" item.

For each page ID, the "document.xxx" is recorded in the "original document name" item, and the page number in the original document is recorded in the "page number in division document" item.

In addition, the page 1 of the "document.xxx", that is, the page with the page ID 0011 is moved to the page 1 of the "document-1.xxx". Therefore, "..\folderA\document-1.xxx" is recorded in the "division document name of movement destination" item of this page, and the page 1 is recorded in the "page number in division document" item.

In addition, the page 2 of the "document.xxx", that is, the page with the page ID 0012 is moved to the page 1 of the "document-2.xxx". Therefore, "..\folderA\document-2.xxx" is recorded in the "division document name of movement destination" item of this page, and the page 1 is recorded in the "page number in division document" item.

In addition, the page 3 of the "document.xxx", that is, the page with the page ID 0013 is moved to the page 1 of the "document-3.xxx". Therefore, "..\folderA\document-3.xxx" is recorded in the "division document name of movement destination" item of this page, and the page 1 is recorded in the "page number in division document" item.

In addition, the page 4 of the "document.xxx", that is, the page with the page ID 0014 is moved to the page 1 of the "document-4.xxx". Therefore, "..\folderA\document-4.xxx" is recorded in the "division document name of movement destination" item of this page, and the page 1 is recorded in the "page number in division document" item.

In addition, the page 5 of the "document.xxx", that is, the page with the page ID 0015 is moved to the page 1 of the "document-5.xxx". Therefore, "..\folderA\document-5.xxx" is recorded in the "division document name of movement destination" item of this page, and the page 1 is recorded in the "page number in division document" item.

In addition, the user B who performs the "split" operation on the original document is recorded in the item "name of user who executes operation" of the pages with the page IDs 0011 to 0015.

Next, with reference to FIG. 6, information recorded in the co-editing database 33B in a case where the "extract" is performed as an operation of dividing a document into a plurality of division documents will be described. Here, an example of a case where the user B extracts only a page 8 from an original document named "document.xxx" consisting of 10 pages as an original document will be described.

In the present example, it is assumed that the page 8 of the "document.xxx" is moved to a page 1 of a document named "document-page8.xxx" as a division document of a movement destination. In addition, it is assumed that the pages 1 to 7 and the pages 9 to 10 of the "document.xxx" are changed to a total of 9 pages of sentences as the "document.xxx".

In this case, as illustrated in FIG. 6, for example, page IDs of 0021 to 0030 are assigned to the respective pages 1 to 10 of the original document, in the "page ID" item.

For each page ID, the "document.xxx" is recorded in the "original document name" item, and the page number in the original document is recorded in the "page number in division document" item.

The page 8 of the "document.xxx", that is, the page with the page ID 0028 is moved to the page 1 of the "document-page8.xxx".

Therefore, "..\folderA\document-page8.xxx" is recorded in the "division document name of movement destination" item of this page, and the page 1 is recorded in the "page number in division document" item.

In addition, the pages 1 to 7 and the pages 9 to 10 of the "document.xxx", that is, the pages with the page IDs 0021 to 0027 and 0029 to 0030 are changed to the pages 1 to 9 of the "document.xxx" in order from a head.

Therefore, "document.xxx" is recorded in the "division document name of movement destination" item of these pages, and the pages 1 to 9 are recorded in order in the "page number in division document" item.

In addition, the user B who performs the "extract" operation on the original document is recorded in the "name of user who executes operation" item of the pages with the page IDs 0021 to 0030.

Description of Operation

Next, an operation of the document editing system 1 according to the present exemplary embodiment will be described with reference to FIGS. 7 to 18.

First, with reference to FIG. 7, an editing screen to be displayed on the display unit 25 of the terminal 20 in a case where a document is edited will be described. As illustrated in FIG. 7, the edit screen has a display region 101 for a document name, a display region 102 for document contents, buttons 103 to 106, and a display region 107 for a currently displayed page number.

The display region 101 displays a name of a document currently being edited. A page 111 currently being edited is displayed in the display region 102. In the present example, the page 111 currently being edited is displayed at a head, and the remaining pages are displayed to be overlapped on a back side of the page 111.

The button 103 is a button for displaying a first page of the document currently being edited. The button 104 is a button for displaying a preceding page of a page of the document currently being edited. The button 105 is a button for displaying a following page of the page of the document currently being edited. The button 106 is a button for displaying the last page of the document currently being edited.

In addition, on this editing screen, it is possible to perform an operation of dividing the original document, which is the currently displayed document, into a plurality of division documents.

In the document editing system 1, one document can be co-edited by a plurality of users at the same time. For example, in a case where the user A and the user B co-edit "document.xxx" at the same time, an editing screen is displayed on both the display unit 25 of the terminal 20 operated by the user A and the display unit 25 of the terminal 20 operated by the user B. In addition, on the edit screen of the user A and the edit screen of the user B, it is possible to perform an editing operation on "document.xxx" independently of each other.

Here, while the user A is editing some pages of the "document.xxx" that is the original document, the user B may perform an operation of dividing the "document.xxx" into a plurality of division documents.

For example, as described with reference to FIG. 4, it is assumed that while the user A is editing the page 8 of the "document.xxx" consisting of the 10 pages, the user B performs a "divide" operation of dividing "document.xxx" between the page 5 and the page 6 into two division documents. At this time, the pages 1 to 5 of the "document.xxx" are moved to the pages 1 to 5 of the "document-1.xxx", and the pages 6 to 10 of the "document.xxx" are moved to the page 1 to page 5 of the "document-2.xxx".

Figure 8:
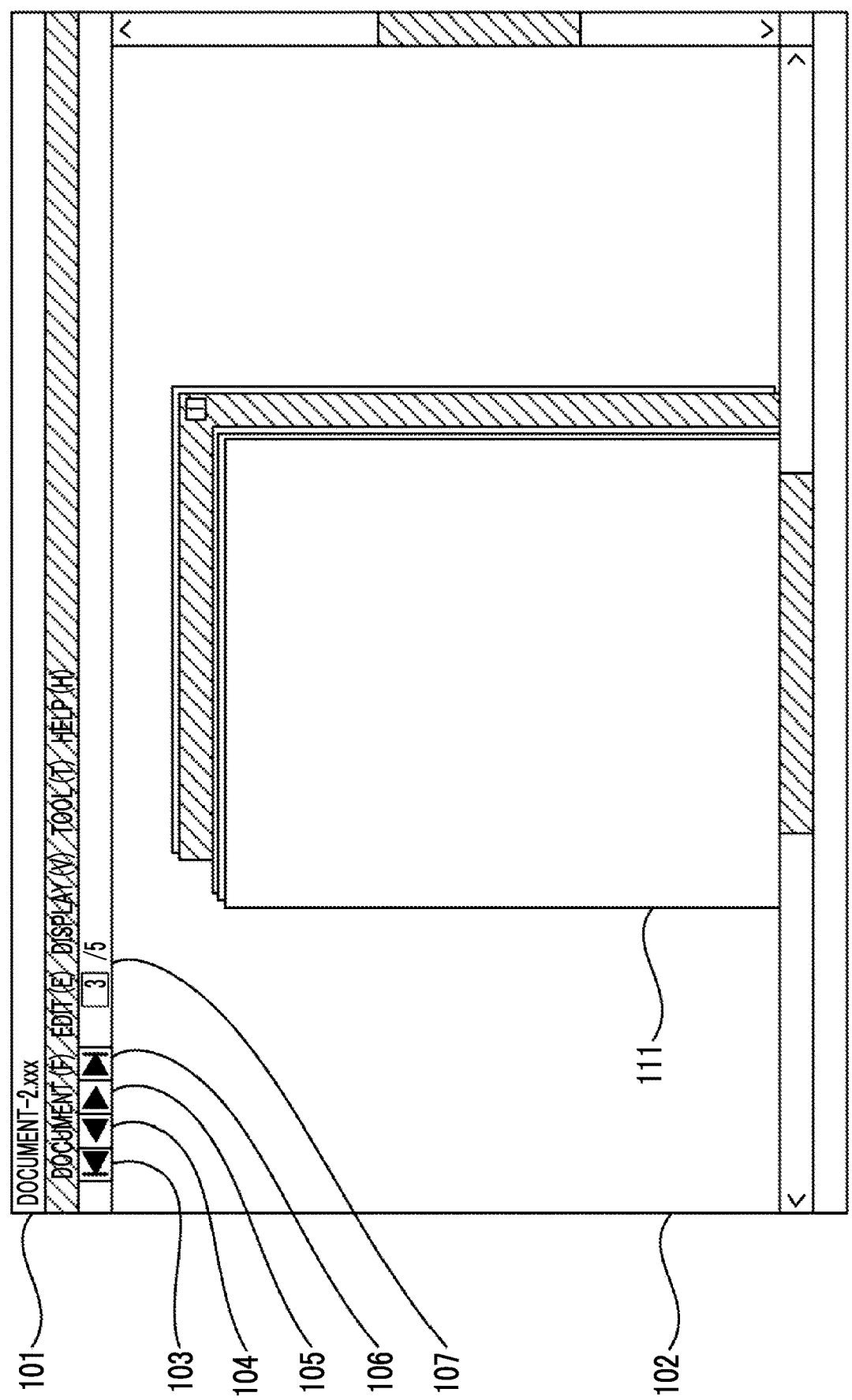
FIG. 8 is a diagram illustrating another display example of the editing screen, and is a diagram illustrating a state in which a division document is displayed.

In this case, the page 8 of the "document.xxx" being edited by the user A is moved to the page 3 of the "document-2.xxx". Therefore, as illustrated in FIG. 8, the "document-2.xxx" including the page 8 of the "document.xxx" that is the original document is displayed on the editing screen of the user A. At this time, in the currently edited page 111 in the display region 102, the page 3 of the "document-2.xxx" corresponding to the page 8 of the "document.xxx" that is the original document is displayed.

On this editing screen, even in a case where the buttons 103 to 106 are selected, only the page included in the "document-2.xxx" can be displayed, so that the pages 1 to 5 of the "document.xxx" that is the original document cannot be displayed.

Therefore, the control unit 41 of the document editing apparatus 10 always monitors a use status of the "document.xxx", and in a case where a second user performs an operation of dividing the original document into a plurality of division documents while a first user is editing the "document.xxx" that is the original document, this case is detected. In the present example, the user A corresponds to the first user, and the user B corresponds to the second user. In a case where the control unit 41 detects that the operation of dividing the original document into the plurality of division documents is performed, an operator for displaying a division document different from a division document including a page being edited is displayed on the edit screen of the user A.

At this time, the control unit 41 of the document editing apparatus 10 notifies the control unit 51 of the terminal 20 of the user A that the original document is divided into the plurality of division documents. Then, under the control of the control unit 41 of the document editing apparatus 10, in cooperation with the control unit 51 of the terminal 20, an operator for displaying a division document different from a division document including the page being edited is displayed on the editing screen displayed on the display unit 25.

That is, the control unit 41 of the document editing apparatus 10 takes the lead in controlling the display of the operator for displaying the division document different from the division document including the page being edited on the editing screen.

Regarding the display of such an operator, for example, the control unit 41 may display at least one of an operator for displaying a preceding page in the original document of a page being edited or an operator for displaying a following page in the original document of the page being edited, on the edit screen of the user A.

Here, in a case where the preceding page in the original document of the page being edited is included in a division document other than a division document including the page being edited, the operator for displaying the preceding page functions as an operator for displaying the other division document. Here, in a case where the following page in the original document of the page being edited is included in a division document other than the division document including the page being edited, the operator for displaying the following page functions as an operator for displaying the other division document.

The operator for displaying the preceding or following page, which also functions as an operator for displaying the other division document, may be displayed at all times, or may be displayed only in a necessary case.

Here, a mode of displaying the operator for displaying the preceding or following page only in a necessary case will be described.

First, in a case where an operation of dividing an original document into a plurality of division documents, the control unit 41 refers to the co-editing database 33B to grasp which page of which division document each page of the original document is moved to.

As illustrated in FIG. 8, in the currently edited page 111 of the edit screen of user A, in a case where the page 3 of the "document-2.xxx" is displayed, by selecting the button 104, the page 2, which is the preceding page, can be displayed. Further, by selecting the button 105, it is possible to display the page 4, which is the following page.

Figure 9:
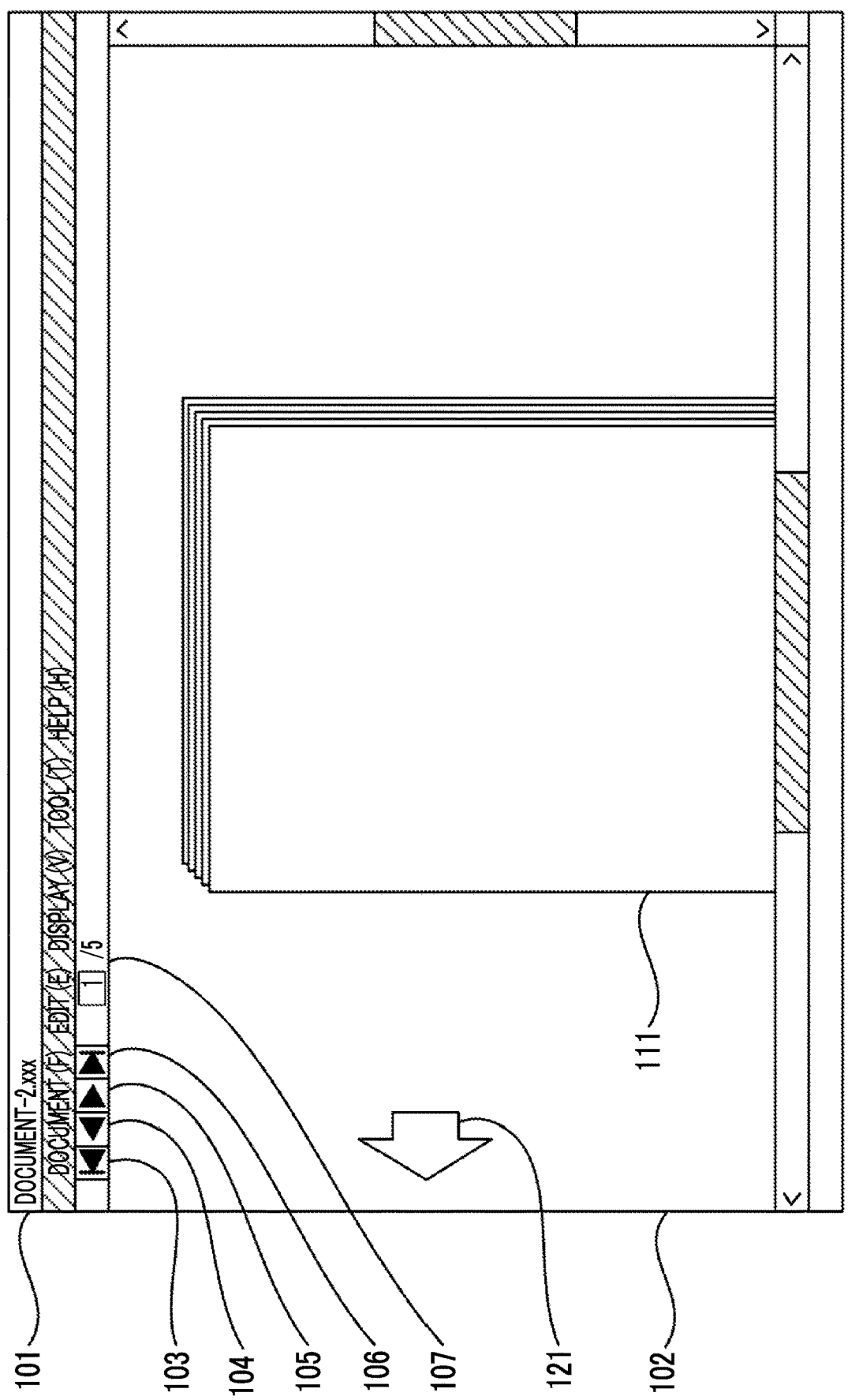
FIG. 9 is a diagram illustrating still another display example of the editing screen, and is a diagram illustrating a state in which an operator for displaying a preceding page of the original document is displayed.

Meanwhile, as illustrated in FIG. 9, in a case where the page 1 of the "document-2.xxx" is displayed on the page 111 currently being edited on the edit screen of the user A, the page 5, which is the other division document, of the division document "document-1.xxx" cannot be displayed even in a case where the button 104 is selected.

In such a case, the control unit 41 displays, at a left end of the display region 102 of the edit screen, an operator 121 which functions as an operator for displaying the preceding page and an operator for displaying the page 5 of the "document-1.xxx", which is the other division document.

Figure 10:
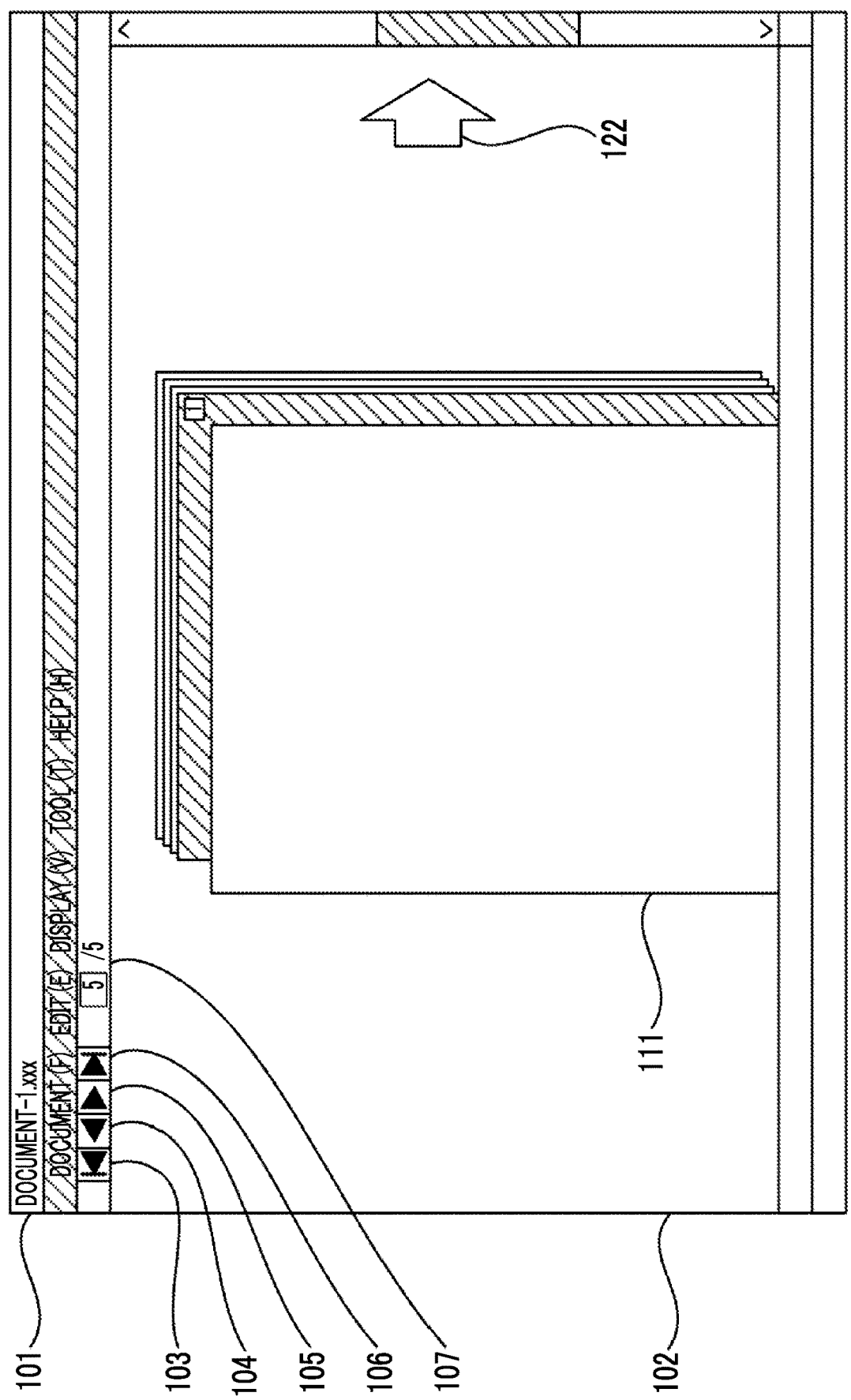
FIG. 10 is a diagram illustrating still another display example of the editing screen, and is a diagram illustrating a state in which an operator for displaying a following page of the original document is displayed.

In a case where the operator 121 is selected by the user, the control unit 41 of the document editing apparatus 10 switches the editing screen into an editing screen for displaying the page of the "document-1.xxx" as illustrated in FIG. 10, and displays the page 5 of the "document-1.xxx" in the display region 102 of this editing screen.

In a case where the page 5 of the "document-1.xxx" is displayed on the page 111 currently being edited on the edit screen of the user A, the page 1, which is the other division document, of the division document "document-2.xxx" cannot be displayed even in a case where the button 105 is selected.

In such a case, the control unit 41 displays, at a right end of the display region 102 of the edit screen, an operator 122 which functions as an operator for displaying the following page and an operator for displaying the page 1 of the "document-2.xxx", which is the other division document.

There are no particular restrictions on the designs of the operators 121 and 122, and the operators 121 and 122 may be designed in any mode other than the arrow shape illustrated in FIGS. 9 and 10, such as displaying a symbol such as "<" or ">".

In the present exemplary embodiment, the control unit 41 may display at least a part of the preceding page in the original document of the page being edited and the following page in the original document of the page being edited to be adjacent to the page being edited. In a case where the page being edited and the preceding page in the original document of the page being edited are included in different division documents, the control unit 41 may display a display mode in which it is seemed that the two pages are respectively included indifferent division documents. Ina case where the page being edited and the following page in the original document of the page being edited are included indifferent division documents, the control unit 41 may display a display mode in which it is seemed that the two pages are respectively included in the different division documents.

Figure 11:
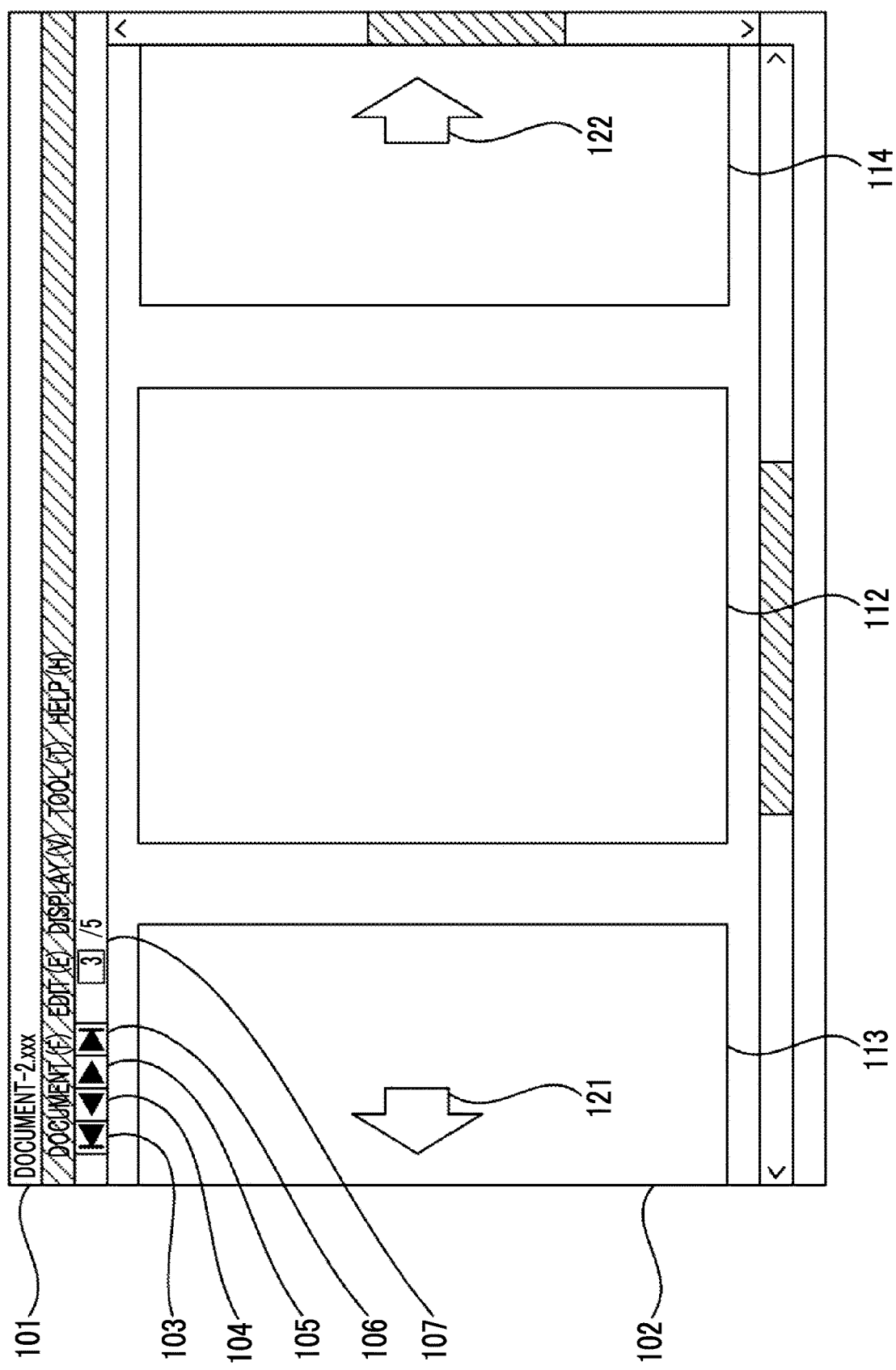
FIG. 11 is a diagram illustrating still another display example of the editing screen, and is a diagram illustrating a state in which some of pages before and after a page being edited are displayed to be adjacent to the page being edited.

A display example in this case is illustrated in FIG. 11. As illustrated in FIG. 11, in the display region 102 of the edit screen, a page 112 currently being edited, a part of a preceding page 113 in the original document of the page being edited, and a following page 114 in the original document of the page being edited are displayed.

In addition, at the left end of the display region 102 of the editing screen, the operator 121 for displaying the preceding page in the original document of the page being edited is always displayed. This operator 121 functions as an operator for displaying, in a case where the preceding page is included in a division document other than the division document including the page being edited, the other division document.

In addition, at the right end of the display region 102 of the editing screen, the operator 122 for displaying the following page in the original document of the page being edited is always displayed. This operator 122 functions as an operator for displaying, in a case where the following page is included in a division document other than the division document including the page being edited, the other division document.

In the example in FIG. 11, the page 3 of the "document-2.xxx" is displayed on the currently edited page 112 of the editing screen. In this case, since both the preceding page and the next page are included in the "document-2.xxx", the control unit 41 performs a normal display in the display region 102 as described above.

Figure 12:
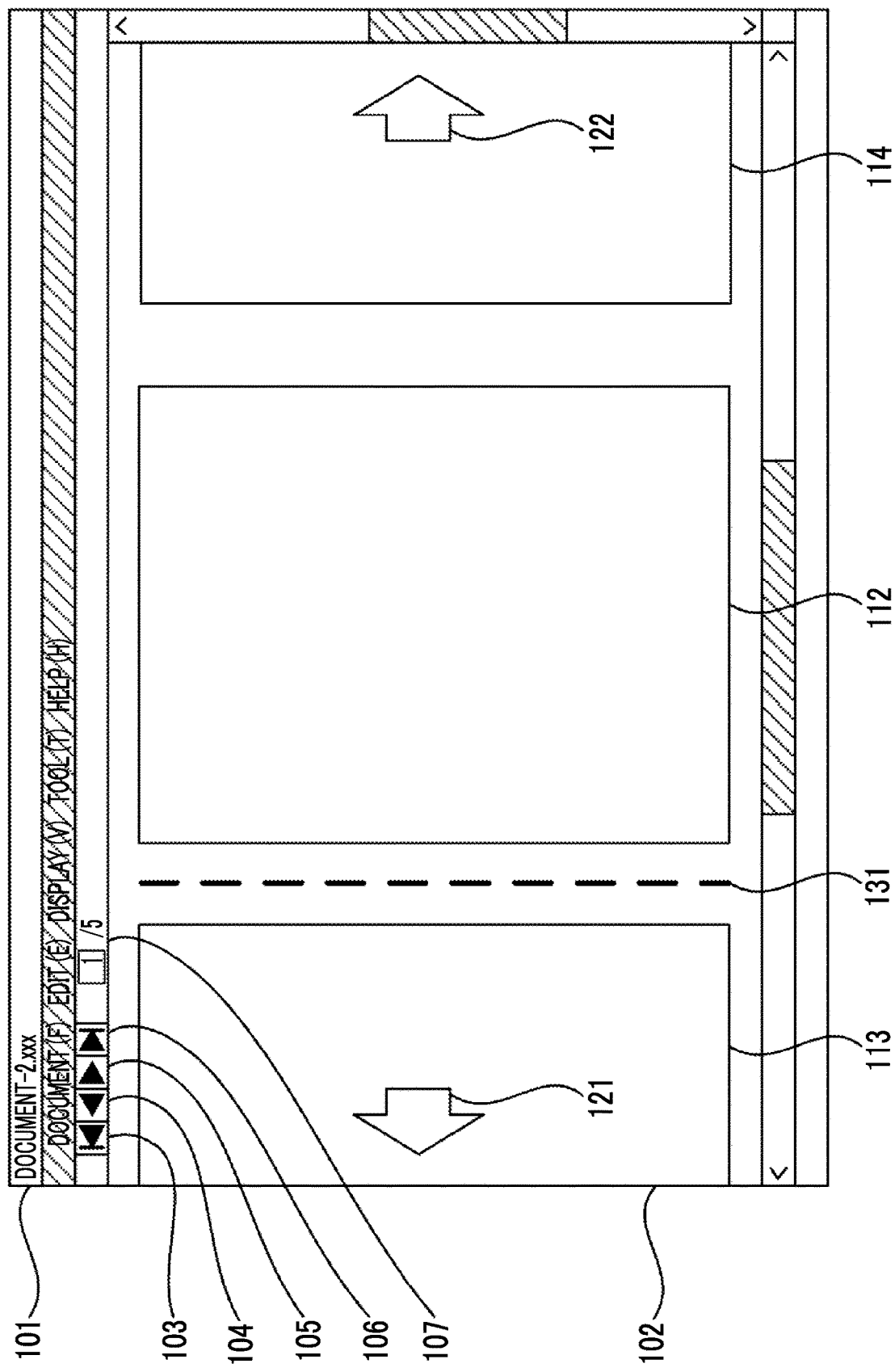
FIG. 12 is a diagram illustrating a state in which dotted lines indicating that two adjacent pages are respectively included in different division documents are displayed on the edit screen illustrated in FIG. 11.
Figure 13:
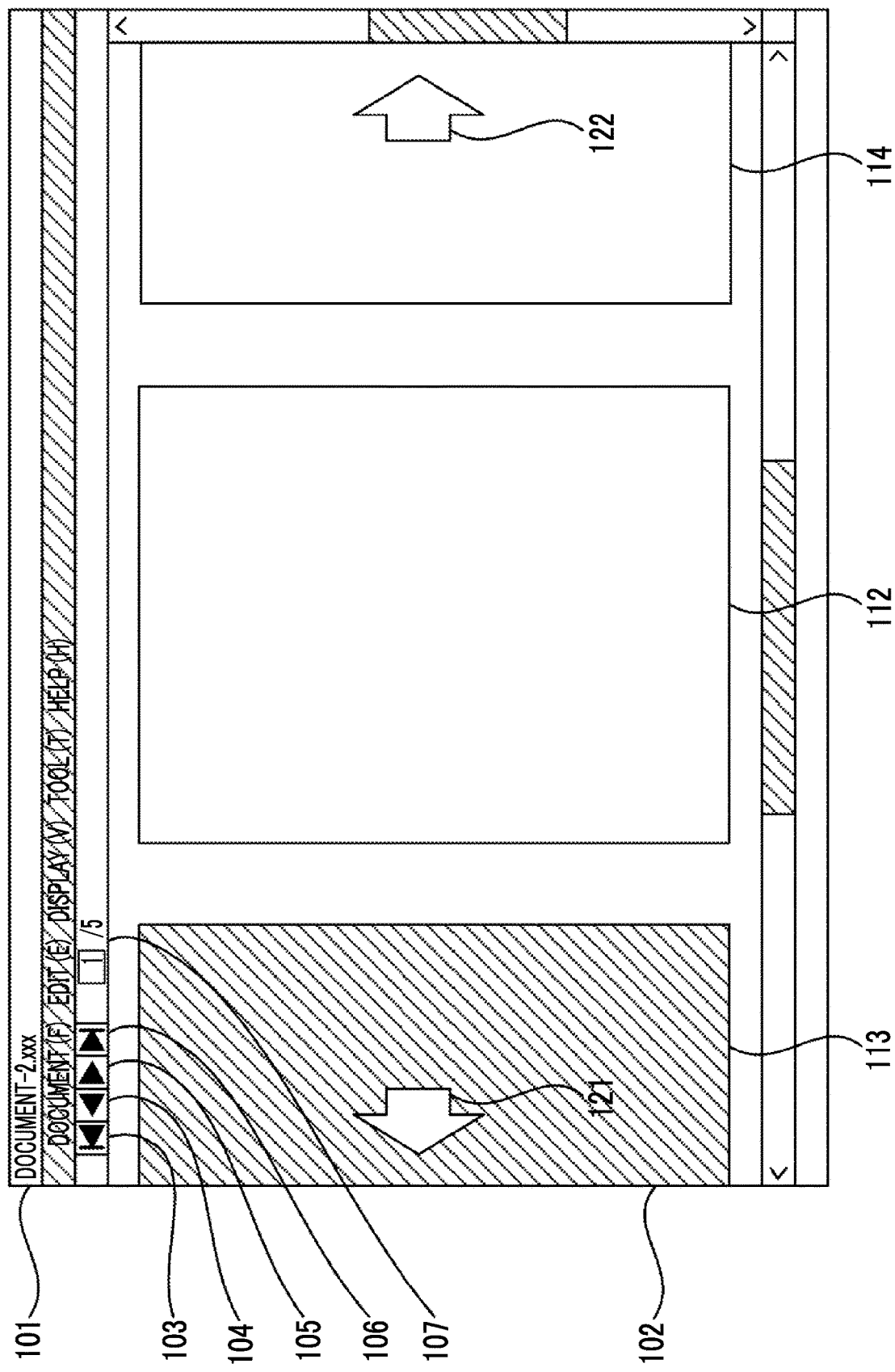
FIG. 13 is a diagram illustrating a state in which one page is grayed out on the edit screen illustrated in FIG. 11 to indicate that the two adjacent pages are respectively included in different division documents.

Meanwhile, as illustrated in FIG. 12, in a case where the page 1 of the "document-2.xxx" is displayed on the currently edited page 112 of the editing screen, the preceding page is not included in the "document-2.xxx". In such a case, between the currently edited page 112 and the preceding page 113 in the display region 102, the control unit 41 displays a dotted line 131 indicating that the two pages are respectively included in different division documents.

The display for indicating that the two pages are respectively included in the different division documents is not limited to the dotted line, and may be displayed with another line type such as a solid line or a double line, or may be displayed with some symbols between the two pages.

In addition, instead of displaying the line or symbol as described above, as illustrated in FIG. 13, any display mode, such as graying out the preceding page 113 included in the different division document, may be used as long as it is seem that the two pages are respectively included in the different division documents.

Further, in a case where an operation of dividing the original document into a plurality of division documents is performed, the control unit 41 may notify the first user that the original document is divided.

In this case, as the notification that the original document is divided, the control unit 41 may display a symbol indicating the division document on the screen on which the page being edited by the first user is displayed, and cause the symbol to function as an operator for displaying the division document.

Figure 14:
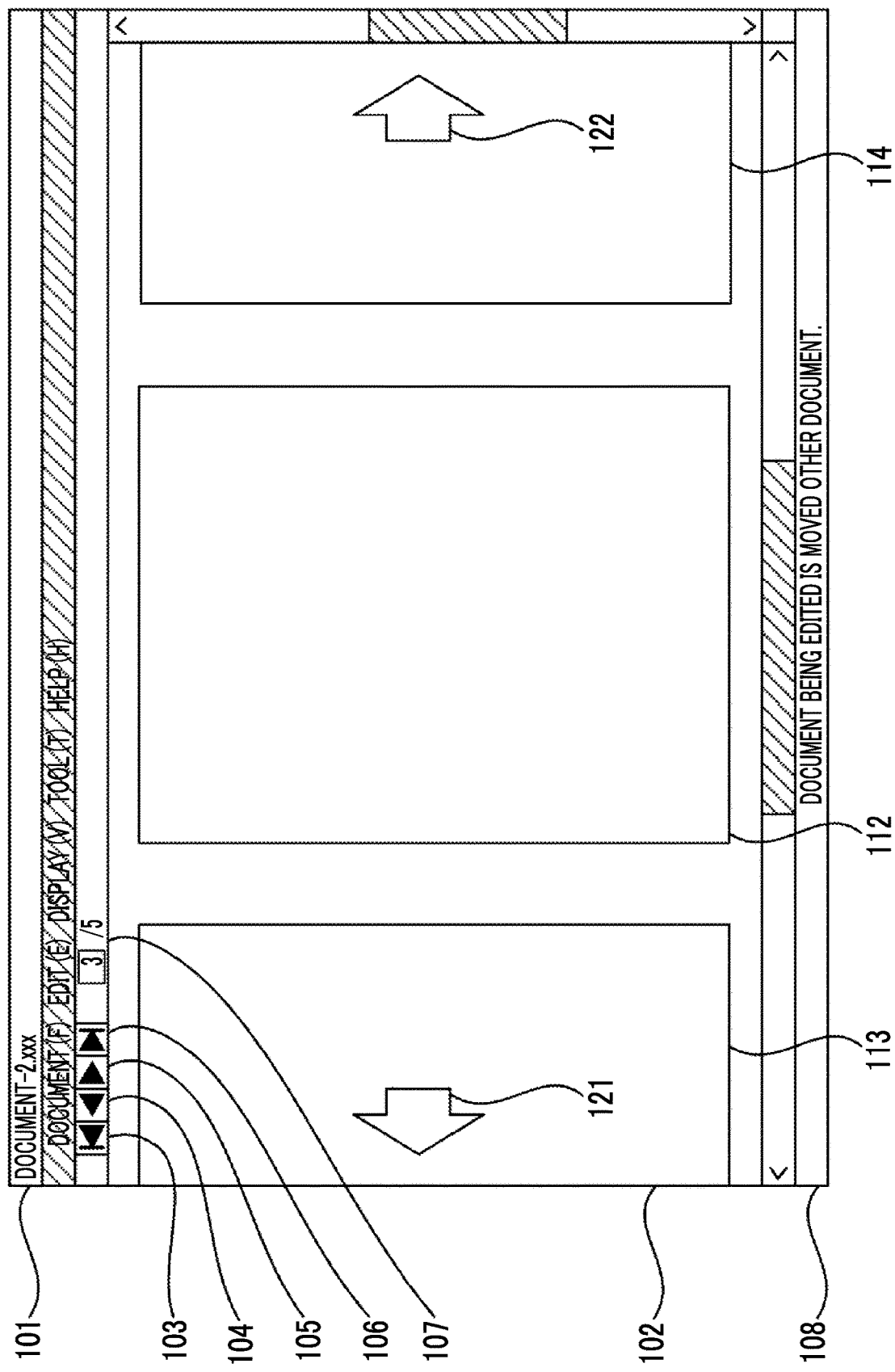
FIG. 14 is a diagram illustrating a state in which a notification message indicating that an operation of dividing the original document into a plurality of division documents is performed is displayed on the editing screen illustrated in FIG. 11.

A display example in this case is illustrated in FIG. 14. As illustrated in FIG. 14, the editing screen further has a display region 108 for a notification message. In a case where an operation of dividing an original document into a plurality of division documents is performed, the control unit 41 displays a notification message such as "document being edited is moved to another document" in the display region 108.

The notification that the original document is divided is not limited to the notification with a display of the sentence, and may be a notification with another section such as a notification by voice.

Figure 15:
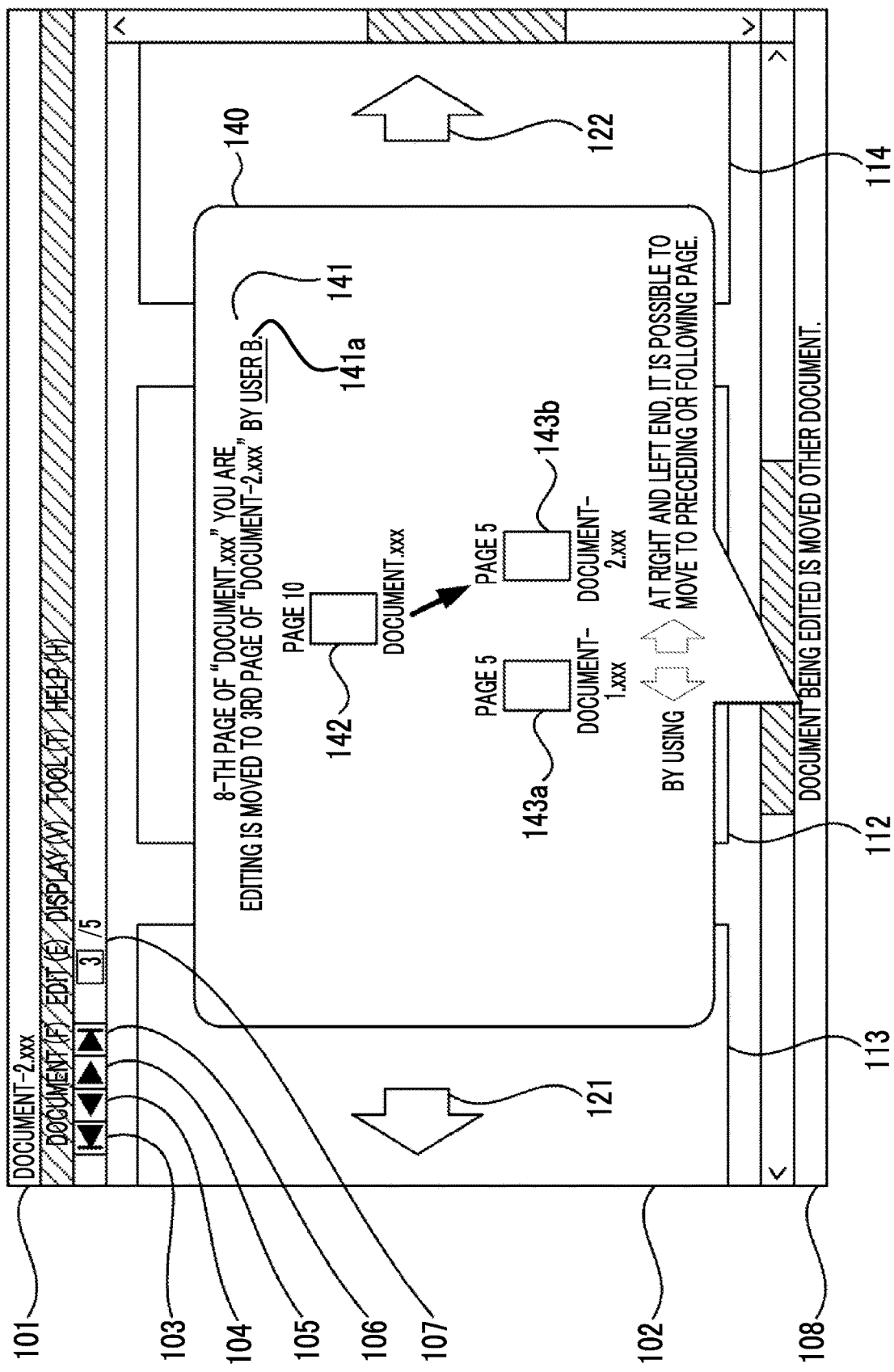
FIG. 15 is a diagram illustrating a state in which a display box is displayed in a case where a "divide" operation is performed on the edit screen illustrated in FIG. 14.

Further, in a case where a cursor for inputting an instruction is placed on the notification message, the control unit 41 may display a display box 140 indicating details of the operation of dividing the original document into the plurality of division documents in the edit screen, as illustrated in FIG. 15.

FIG. 15 illustrates a display example in a case where the "divide" is performed as an operation of dividing an original document into a plurality of division documents. In the display box 140, a sentence 141 for describing a movement status of a page being edited, an icon 142 indicating the original document, icons 143*a* to 143*b* indicating the division documents, and the like are displayed. The symbol indicating the division document is not limited to the icon, and may be any mode as long as the symbol is a text string indicating a document name of the division document, or a text string and a graphic capable of specifying the division document, such as a thumbnail image.

As the sentence 141 for describing a movement status of the page being edited, for example, a sentence such as "8-th page of "document.xxx" you are editing is moved to 3rd page of "document-2.xxx" by user B." is displayed.

Figure 16:
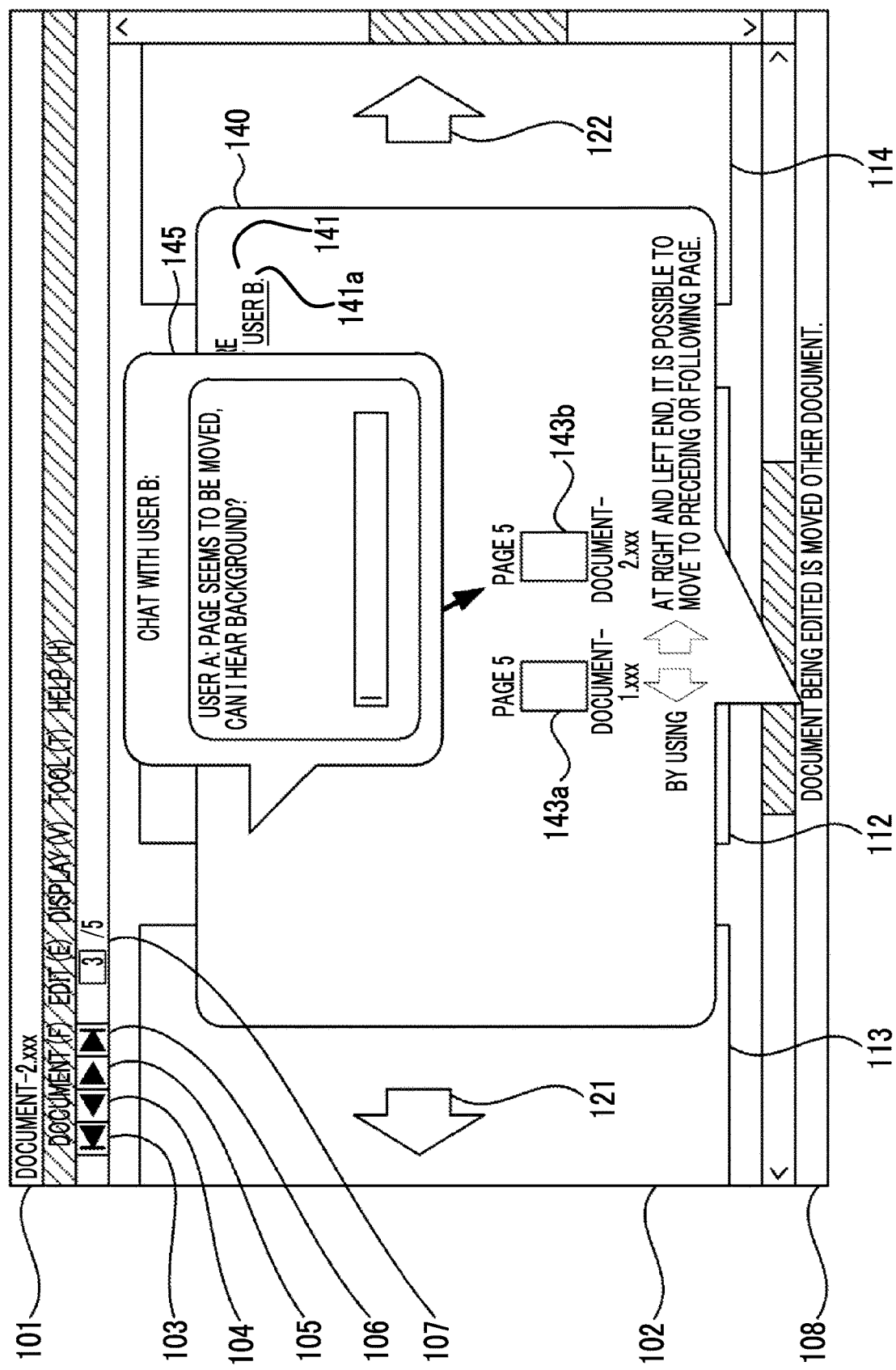
FIG. 16 is a diagram illustrating a state in which a chat box is displayed on the edit screen illustrated in FIG. 15.

As illustrated in FIG. 16, the control unit 41 may display a chat box 145 capable of chatting with a user in a case where a sentence 141*a* indicating a name of the user in the sentence 141 is selected.

For each of the icon 142 indicating the original document and the icons 143*a* to 143*b* indicating the division documents, the number of pages of the document indicated by the icon is displayed above the icon, and a file name of the document indicated by the icon is displayed below the icon.

In a case where the "divide" is performed as an operation of dividing the original document into the plurality of division documents, in the display box 140, each icon is displayed to indicate that "document.xxx" that is the original document is divided into two division documents "document-1.xxx" and "document-2.xxx". In addition, an arrow is displayed to indicate that the page being edited in the "document.xxx" is moved to "document-2.xxx".

Further, in a case where the icon 143*a* or 143*b* is selected in the display box 140, the control unit 41 may display a document indicated by the selected icon on the editing screen. That is, the icons 143*a* to 143*b*, which are symbols indicating the division documents, may function as operators for displaying the division documents.

Figure 17:
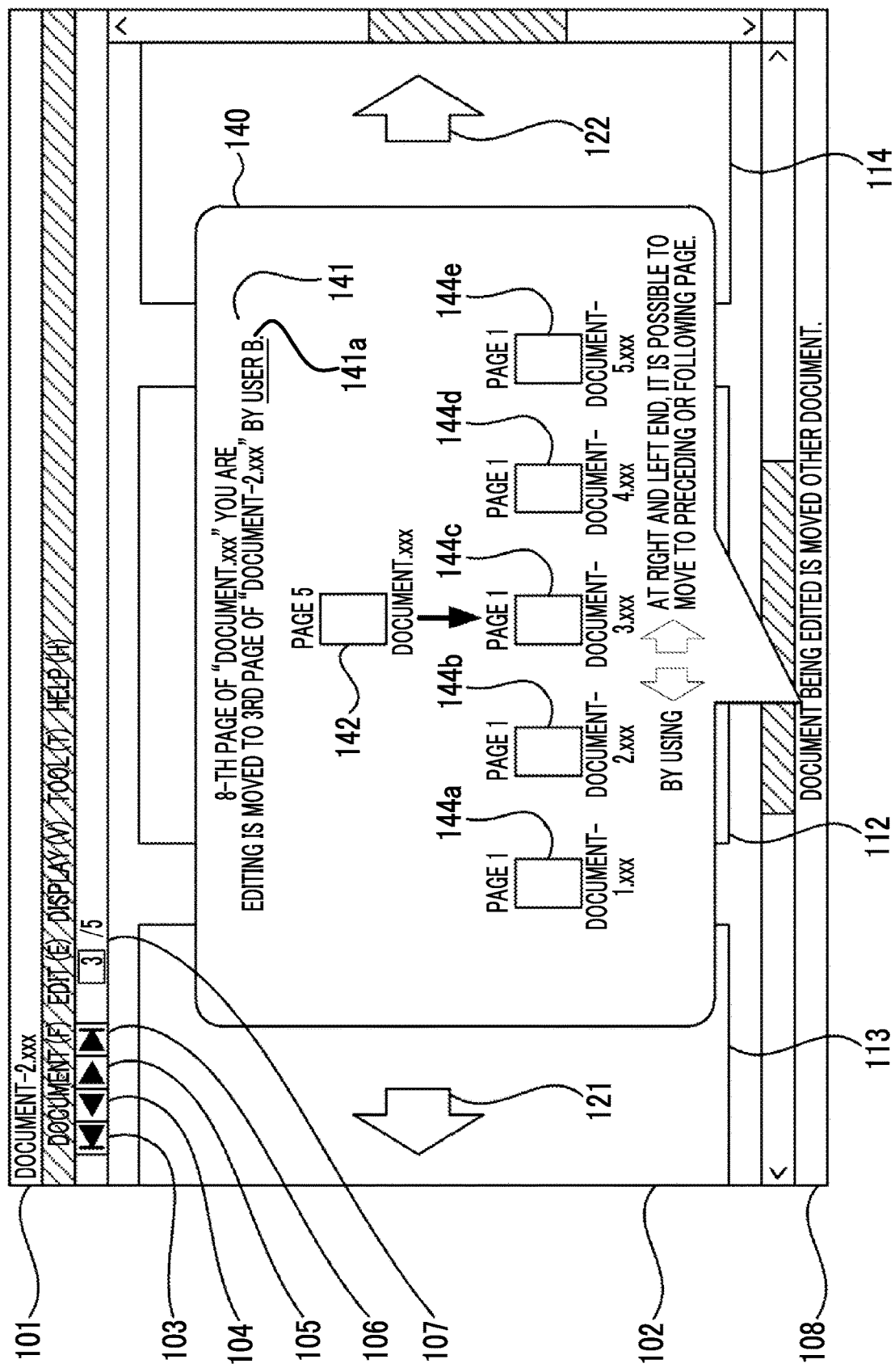
FIG. 17 is a diagram illustrating a state in which the display box is displayed in a case where a "split" operation is performed on the edit screen illustrated in FIG. 14.

As illustrated in FIG. 17, in a case where the "split" is performed as an operation of dividing an original document into a plurality of division documents, icons 144a to 144e indicating all files generated by the "split" are displayed in the display box 140.

Figure 18:
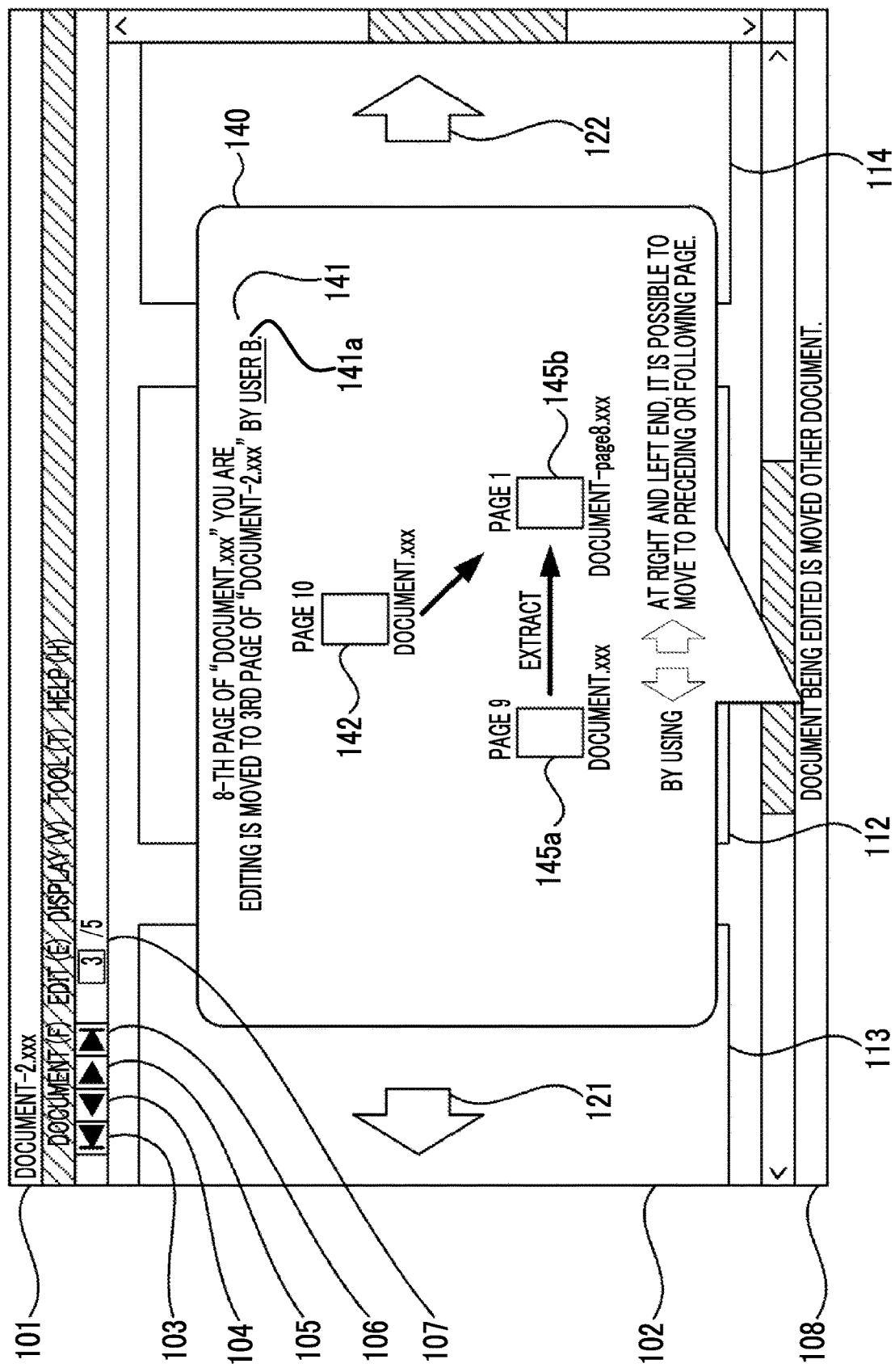
FIG. 18 is a diagram illustrating a state in which the display box is displayed in a case where an "extract" operation is performed on the edit screen illustrated in FIG. 14.

In addition, as illustrated in FIG. 18, in a case where the "extract" is performed as an operation of dividing the original document into the plurality of division documents, icons 145a to 145b indicating all files generated by the "extract" are also displayed in the display box 140.

Next, in the document editing system 1 of the present exemplary embodiment, a flow of the processes in a case where an operation of dividing an original document into a plurality of division documents is performed will be described.

Figure 19:
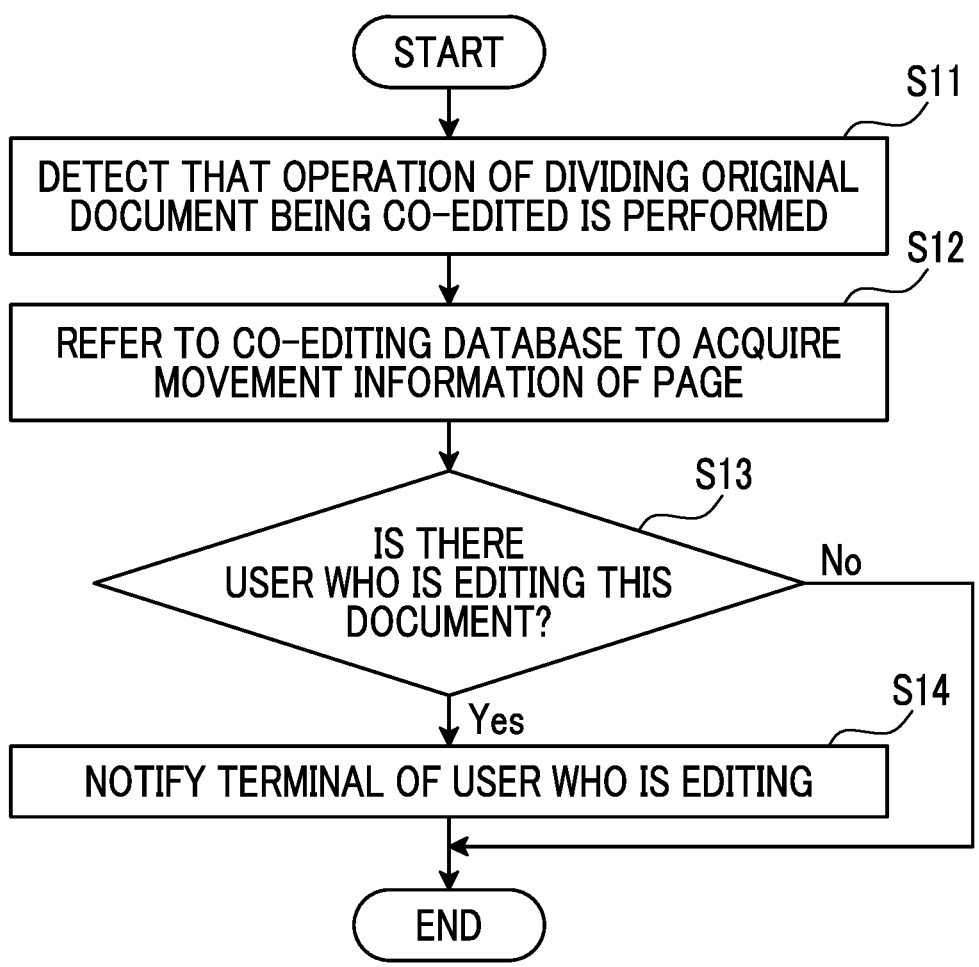
FIG. 19 is a flowchart illustrating a flow of processes of a control unit of the document editing apparatus in a case where the operation of dividing the original document into the plurality of division documents is performed.

First, the flow of the processes of the control unit 41 of the document editing apparatus 10 in the case where the operation of dividing the original document into the plurality of division documents is performed will be described with reference to the flowchart in FIG. 19.

In step S11, in a case where the control unit 41 detects that an operation of dividing an original document being co-edited into a plurality of division documents is performed, in step S12, the control unit 41 refers to the co-editing database 33B to acquire movement information of each page in the original document.

Next, in step S13, the control unit 41 determines whether or not there is a user who is editing the divided original document other than a user who performs the operation of dividing the original document.

In step S13, in a case where it is determined that there is the user who is editing the divided original document, the control unit 41 notifies a terminal of the user that the original document is divided into the plurality of division documents in step S14.

In step S13, in a case where it is determined that no user is editing the divided original document, the control unit 41 ends the process.

Figure 20:
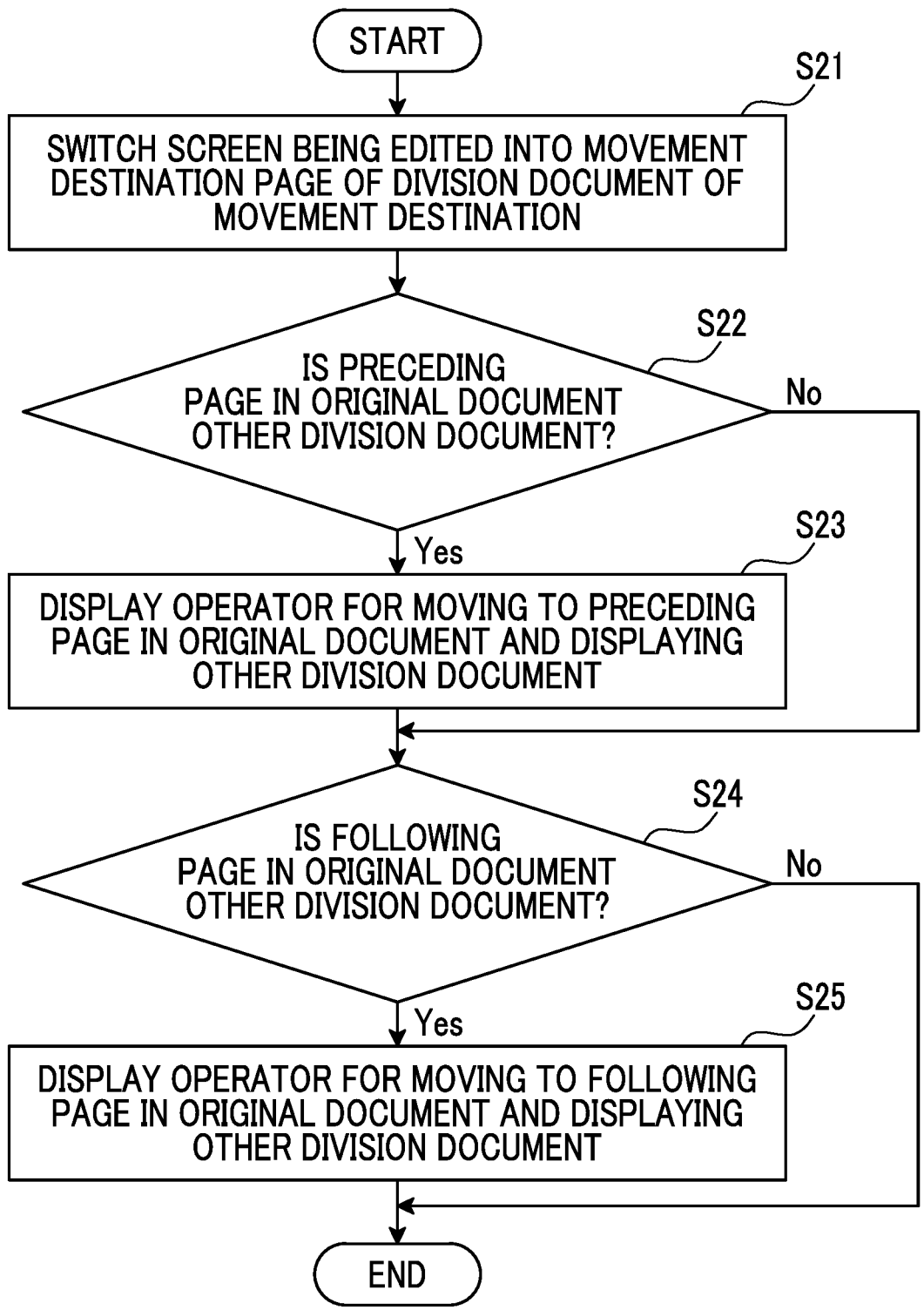
FIG. 20 is a flowchart illustrating a flow of processes of the control unit of the document editing apparatus in a case where an operator for displaying a division document different from a division document including the page being edited is displayed on the edit screen.

Next, with reference to the flowchart in FIG. 20, a flow of processes of the control unit 41 of the document editing apparatus 10 in a case where an operator for displaying a division document different from a division document including a page being edited is displayed on an editing screen of a user terminal will be described.

After notifying the user terminal that an original document is divided into a plurality of division documents, in step S21, the control unit 41 switches the screen being edited into a movement destination page of a division document of a movement destination.

Next, in step S22, the control unit 41 determines whether or not a preceding page in the original document of the page currently displayed on the editing screen is moved to another division document.

In step S22, in a case where it is determined that the preceding page is moved to the other division document, in step S23, the control unit 41 displays an operator for moving to the preceding page in the original document and displaying the other division document on the editing screen, and shifts the process to step S24.

In step S22, in a case where it is determined that the preceding page is not moved to the other division document, the control unit 41 shifts to step S24 as it is.

Next, in step S24, the control unit 41 determines whether or not a following page in the original document of the page currently displayed on the editing screen is moved to another division document.

In step S24, in a case where it is determined that the following page is moved to the other division document, in step S25, the control unit 41 displays an operator for moving to the following page in the original document and displaying the other division document on the editing screen, and ends the process.

In step S24, in a case where it is determined that the following page is not moved to the other division document, the control unit 41 ends the process.

Modification Example

Although the document editing system 1 according to one exemplary embodiment of the present invention is described above, the present invention is not limited to the exemplary embodiment described above and can be modified as appropriate.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Supplementary Note

Hereinafter, the exemplary embodiments according to the present disclosure will be described.

(((1)))

A document editing apparatus comprising:

a processor configured to:

in a case where a second user performs an operation of dividing an original document consisting of a plurality of pages into a plurality of division documents while a first user is editing the electronic original document, display an operator for displaying another division document different from a division document including a page being edited by the first user, on a screen on which the page being edited is displayed.

(((2)))

The document editing apparatus according to (((1))), wherein the processor is configured to:

display at least one of an operator for displaying a preceding page in the original document of the page being edited or an operator for displaying a following page in the original document of the page being edited, on the screen on which the page being edited by the first user is displayed, in a case where the preceding page in the original document of the page being edited is included in a division document other than the division document including the page being edited, the operator for displaying the preceding page functions as an operator for displaying the other division document, and in a case where the following page in the original document of the page being edited is included in the division document other than the division document including the page being edited, the operator for displaying the following page functions as the operator for displaying the other division document.

(((3)))

The document editing apparatus according to (((2))), wherein the processor is configured to:

display at least a part of the preceding page in the original document of the page being edited and at least a part of the following page in the original document of the page being edited to be adjacent to the page being edited, in a case where the page being edited and the preceding page in the original document of the page being edited are included in different division documents, display a display mode for indicating that the two pages are respectively included in the different division documents, and in a case where the page being edited and the following page in the original document of the page being edited are included in different division documents, display a display mode for indicating that the two pages are respectively included in the different division documents.

(((4)))

The document editing apparatus according to any one of (((1))) to (((3))), wherein the processor is configured to:

in a case where the operation of dividing the original document into the plurality of division documents is performed, notify the first user that the original document is divided.

(((5)))

The document editing apparatus according to (((4))), wherein the processor is configured to:

display a symbol indicating the division document on the screen on which the page being edited by the first user is displayed, as a notification that the original document is divided, and the symbol functions as an operator for displaying the division document.

(((6)))

A non-transitory computer readable medium storing a program causing a computer to execute a process comprising:

displaying, in a case where a second user performs an operation of dividing an original document consisting of a plurality of pages into a plurality of division documents while a first user is editing the electronic original document, an operator for displaying another division document different from a division document including a page being edited by the first user, on a screen on which the page being edited is displayed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document editing apparatus for performing a method during a document editing session of a first user, the apparatus comprising:
a screen;
a processor;
a memory storing the method;
wherein when the method is executed by the processor, the processor is configured to:
determine, while the first user is editing a page of an original electronic document on the screen of the document editing apparatus, that a second user, on a different apparatus, has performed an operation of dividing the original electronic document into a plurality of division documents, wherein the original electronic document consists of a plurality of pages;
in response to the determination, display, on the screen and while the first user is editing the page, an operator for displaying a first document division document different from a second division document, wherein the second division document includes the page being edited by the first user, on the screen;
receive, on the displayed operator, a user operation; and
display, on the screen, the first division document in response to receiving the user operation.

2. The document editing apparatus according to claim 1, wherein the processor is further configured to:
display, on the screen, at least one of an operator for displaying a preceding page in the original electronic document of the page being edited or an operator for displaying a following page in the original electronic document of the page being edited, on the screen, in a case where the preceding page in the original electronic document of the page being edited is included in a division document other than the second division document, the operator for displaying the preceding page functions as a trigger for displaying the first division document, and in a case where the following page in the original electronic document of the page being edited is included in the second division document, the operator for displaying the following page functions as a trigger for displaying the other division document.

3. The document editing apparatus according to claim 2, wherein the processor is further configured to:
display, on the screen, at least a part of the preceding page in the original electronic document of the page being edited and at least a part of the following page in the original electronic document of the page being edited to be adjacent to the page being edited, in a case where the page being edited and the preceding page in the original electronic document of the page being edited are included in different division documents, display, on the screen, a display indicator for indicating that the two pages are respectively included in the different division documents, and in a case where the page being edited and the following page in the original electronic document of the page being edited are included in different division documents, display, on the screen, a display indicator for indicating that the two pages are respectively included in the different division documents.

4. The document editing apparatus according to claim 1, wherein the processor is further configured to:
in a case where the operation of dividing the original electronic document into the plurality of division documents is performed, notify the first user that the original electronic document is divided.

5. The document editing apparatus according to claim 4, wherein the processor is further configured to:
display, on the screen, a symbol indicating a division document on the screen on which the page being edited by the first user is displayed as a notification that the original electronic document is divided, and the symbol functions as a trigger for displaying the division document.

6. A non-transitory computer readable medium for performing a process during a document editing session of a first user, the medium storing a program causing a computer to execute the process comprising:
- determining, while the first user is editing a page of an original electronic document on a screen of the computer, that a second user, on a different computer, has performed an operation of dividing the original electronic document into a plurality of division documents, wherein the original electronic document consists of a plurality of pages;
- in response to the determination, displaying, on the screen of the computer and while the first user is editing the page, an operator for displaying a first document division document different from a second division document, wherein the second division document includes the including a-page being edited by the first user, on the screen;
- receive, on the displayed operator, a user operation; and
- display, on the screen, the first division document in response to receiving the user operation.

7. A document editing method performed during a document editing session of a first user, the method comprising:
- determining, while the first user is editing a page of an original electronic document on a screen of a computer, that a second user, on a different computer, has performed an operation of dividing the original electronic document into a plurality of division documents, wherein the original electronic document consists of a plurality of pages;
- in response to the determination, displaying, on the screen of the computer and while the first user is editing the page, an operator for displaying a first division document different from a second division document, wherein the second division document includes the page being edited by the first user;
- receive, on the displayed operator, a user operation; and
- display, on the screen, the first division document in response to receiving the user operation.

* * * * *